United States Patent [19]

Teer et al.

[11] 4,013,604

[45] Mar. 22, 1977

[54] ETHYLENE-VINYL ESTER-ALKYL VINYL TERPOLYMER EMULSIONS

[75] Inventors: Glenn E. Teer; Jerry G. Higgins; George D. Warren, all of Big Spring, Tex.

[73] Assignee: Cosden Technology, Inc., Big Spring, Tex.

[22] Filed: Feb. 18, 1975

[21] Appl. No.: 550,374

[52] U.S. Cl. .................... 260/29.6 RB; 260/29.6 T
[51] Int. Cl.² ......................................... C08L 31/04
[58] Field of Search ...... 260/29.6 T, 80.78, 94.9 A, 260/23 EM, 29.6 RB, 875; 526/331

[56] References Cited

UNITED STATES PATENTS

| | | | |
|---|---|---|---|
| 3,240,766 | 3/1966 | Thomson et al. | 260/80.78 |
| 3,365,520 | 1/1968 | Foster et al. | 260/80.78 |
| 3,423,353 | 1/1969 | Levine | 260/29.6 T |
| 3,629,179 | 12/1971 | Bristol | 260/29.6 T |

FOREIGN PATENTS OR APPLICATIONS 46-4389  3/1971  Japan ............................ 260/29.6 T

*Primary Examiner*—M. J. Welsh

[57] ABSTRACT

Stable emulsions of terpolymer particles are formed by polymerizing ethylene, a vinyl ester monomer such as vinyl acetate, and an alkyl vinyl monomer having from about 3 up to about 24 carbon atoms in an aqueous medium in the presence of a water soluble persulfate initiator, and a nonionic and/or anionic emulsifier. The resulting novel stable emulsions contain particles of ethylene-vinyl ester-alkyl vinyl terpolymer which will provide film coatings of increased flexibility and toughness. Furthermore, the emulsions have excellent compatibility when blended within conventional polish formulations.

20 Claims, No Drawings

ETHYLENE-VINYL ESTER-ALKYL VINYL TERPOLYMER EMULSIONS

BACKGROUND OF THE INVENTION

This invention relates to polymeric materials. In another aspect, this invention relates to novel stable emulsions formed with terpolymers of ethylene, a vinyl ester monomer, and an alkyl vinyl monomer. In still another aspect, this invention relates to the novel emulsions of particles of ethylene-vinyl ester-alkyl vinyl terpolymers which impart improved characteristics when blended in conventional polish formulations.

Polymeric emulsions are conventionally used in coatings, lacquers, paints and polishes. Polyethylene emulsions which are conventionally used in coatings, lacquers, paints and polishes can be produced by emulsion polymerization techniques such as set forth in U.S. Pat. Nos. 3,226,352 and 3,244,652. Generally, polyethylene emulsions will dry at room temperature to form films which have poor gloss, flexibility and crack resistance and can be easily removed from a substrate to which they are applied by mechanical force. Therefore, such polyethylene latexes are admixed with other materials including resins, leveling agents, plasticizers and fluxes when used in polishes and the like. However, many conventional polyethylene emulsions have not been utilized in as wide a variety of applications as desired because of incompatibility problems which exist when they are admixed with certain standard formulations of paints, polishes and the like causing precipitation of the solids and other instability problems. Therefore, there is a continuing need for polymeric emulsions comprising ethylene which are extremely stable and compatible with various types of latexes and other formulations which are utilized in coating compositions such as paints and polishes.

STATEMENT OF THE INVENTION

According to the invention, novel stable emulsions of ethylene containing terpolymers are provided. The terpolymer particles in the novel emulsions are formed by the copolymerization of ethylene, a vinyl ester monomer, and an alkyl vinyl monomer. These improved emulsions are produced by copolymerizing the monomers in an aqueous medium in the presence of a water soluble persulfate initiator, and an anionic and/or nonionic emulsifier. The resulting emulsions containing the terpolymer have excellent compatibility with conventional polish formulations and will provide film coatings of improved flexibility and toughness as compared to conventional polyethylene emulsions.

DETAILED DESCRIPTION OF THE INVENTION

The novel emulsions can be produced in accordance with the subject invention either under batch or continuous process conditions by contacting pressurized ethylene, a vinyl ester monomer, and an alkyl vinyl monomer in an aqueous medium which contains a water soluble persulfate initiator and an emulsifier. Contact of the monomers with the aqueous medium is made under greater than atmospheric pressure and at an elevated temperature. Generally, the polymerization temperature can range from about 60° to about 150° C and the pressure can generally range from about 1400 psi to about 20,000 psi depending upon the type of emulsifier that is used in the system.

As defined herein, the vinyl ester monomers which can be used in the scope of the subject invention generally include the vinyl esters of straight and branched chain alkyl carboxylic acids and the straight and branched chain alkyl vinyl ethers. The more preferred such vinyl esters which can be used in the scope of the subject invention can be illustrated by the structural formula set forth below:

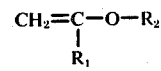

wherein $R_1$ is selected from hydrogen and a methyl group and $R_2$ is selected from straight and branched chain alkyl and acyl groups having from 1 to about 10 carbon atoms and straight and branched chain alkoxy groups having from 2 to about 10 carbon atoms.

Specific examples of suitable such vinyl esters which can be used in the scope of the subject invention include: vinyl acetate, vinyl butyrate, vinyl proponate, vinyl 2-ethylhexoate, ethyl vinyl ether, isopropenylacetate and the like. The vinyl ester monomer can be contained in the aqueous medium in amounts ranging from about 0.5 to about 20% by weight of the aqueous reaction medium.

The alkyl vinyl compounds utilizable within the scope of the subject invention include the straight and branched chain alkyl vinyl compounds having from about 3 through about 24 carbon atoms. The normally liquid alkyl vinyl compounds are generally admixed with the vinyl ester monomer and emulsifier in the aqueous reaction medium before contact of the medium with ethylene is carried out. The normally vaporous alkyl vinyl compounds such as propylene can be introduced with the vaporous ethylene feed during the polymerization process. Generally the alkyl vinyl compounds can be present in an amount in the range of from about 0.1 to about 10% by weight of the aqueous reaction medium. Extremely durable and flexible terpolymers are produced within the scope of the subject invention when utilizing an alkyl vinyl compound having at least about 15 carbon atoms.

Generally, the emulsions produced in accordance with the subject invention comprises a mixture of ethylene homopolymer and the terpolymer of ethylene, the vinyl ester compound and the alkyl vinyl compound. These polymers have a molecular weight in the range of from about 7000 to about 40,000. The particle size of the resulting polymers generally ranges from about 200 to about 1000 angstrom units.

Only a minor catalytic amount of a water soluble persulfate initiator need be present in the aqueous reaction medium. Examples of suitable water soluble persulfates include alkali metal persulfates such as potassium and sodium persulfate and any other water soluble persulfate such as ammonium persulfate and the like. The amount of the water soluble persulfate initiator can vary depending upon the particular emulsifier system which is utilized.

Suitable anionic emulsifiers which can be used in the scope of the subject invention include the saturated fatty acid salts, such as the alkali metal salts and particularly the sodium and potassium salts of saturated fatty acids having from about 12 to about 18 carbon atoms. Examples of suitable such emulsifiers include the alkali metal salts of myristic acid, lauric acid, stearic acid and the like.

Other suitable anionic emulsifiers which can be used in the scope of the subject invention include the alkali metal salts and particularly the sodium and potassium salts of alkyl aryl sulfonic acids and preferably the alkali metal alkyl benzene sulfonates wherein the alkyl group is a straight or branched chain group which contains from about 6 to about 18 carbon atoms. Examples of suitable such materials include sodium and potassium salts of dodecyl benzene sulfonic acid, nonyl benzene sulfonic acid, undecyl benzene sulfonic acid, tetradecyl benzene sulfonic acid, hexadecyl benzene sulfonic acid, mixtures thereof and the like.

Further anionic emulsifiers which can be used in the scope of this invention include the salts and particularly the alkali metal salts of sulfates of fatty alcohols having from about 12 to about 18 carbon atoms or mixtures thereof and salts and particularly alkali metal salts of sulfates of ethoxylated fatty alcohols having from between about 12 to about 18 carbon atoms and an average number of ethoxy groups between about 1 and 5. Examples of such materials include sodium sulfates of $C_{12}$ alcohols, sodium tridecyl alcohol sulfate, and the sodium salt of ethoxylated lauryl sulfate with an average of about 1.5 ethoxy groups.

When utilizing the anionic emulsifiers and particularly the acid salts, the pH of the reaction should be maintained within the range of from about 8.5 to about 14 by the use of basic materials such as sodium hydroxide or potassium hydroxide.

In addition, especially when using the acid salts particularly the saturated fatty acids having about 12 to 18 carbon atoms, a pH adjuster can be present in the aqueous phase to prevent displacement, by stronger acids, of the weak component of the emulsifier, e.g., fatty acid soaps. The pH adjusters employed in this instance are those which in nature and amount used will result in a pH at least about 8.5 in the product removed from the reactor. Since acid is formed during the polymerization, the pH at the time polymerization is initiated is preferably somewhat higher, suitably about 10.5. Alkaline substances having a pH of about 10.5 for example, are potassium phosphates such as tripotassium phosphate and potassium carbonate, which substances are also buffers. To give the desired pH values sodium or potassium hydroxide for example, is added to the aqueous medium in amounts between about 0.25 and about 0.7% by weight thereof. To maintain the pH, buffering alkalies such as tripotassium phosphate or trisodium phosphate can be added to the aqueous medium during the course of the reaction. Furthermore, if the alkyl sulfate type emulsifiers are utilized, the pH adjuster can be omitted since these materials are acid stable to a pH of about 4.

Nonionic emulsifiers which can be used in the scope of this invention are the nonionic alkylphenoxy polyoxyethylene ethanols and preferably the alkylphenoxy polyoxyethylene ethanol emulsifiers having the general formula:

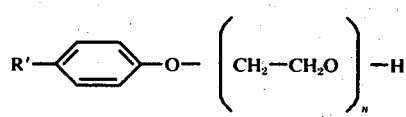

Wherein R' is an alkyl chain having 8 or 9 carbon atoms advisably branched such as a polypropylene or polybutylene chain and n represents an average of 7 to about 15. Some examples of suitable such emulsifiers are as follows:

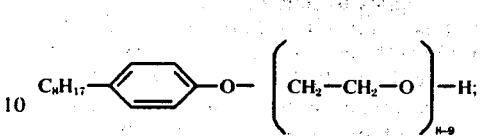

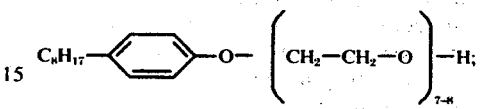

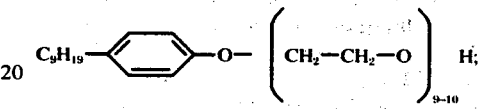

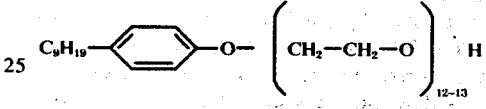

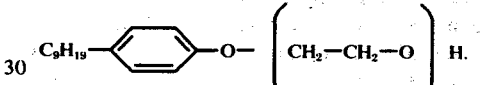

When utilizing the above described alkyl aryl sulfonate salts as emulsifiers, the polymerization is preferably carried out in the presence of a water soluble persulfate initiator in an amount in the range of from about 0.1 to 0.75% by weight of the initiator based upon the liquid reaction medium. Furthermore, the emulsifier should be present in an amount in the range of from about 1 to 7% by weight of the aqueous reaction medium and more preferably from about 3 to about 5% by weight of the aqueous reaction medium. The reaction can occur at a pressure in the range of from about 1400 to about 5000 psi and preferably in the range from about 1550 to about 3000 psi. The process can be carried out at a temperature in the range of from about 60° to 150° C and preferably from about 90° to 100° C.

Likewise, when utilizing the above-described salts of saturated fatty acids or salts of sulfates of fatty alcohols or salts of sulfates of ethoxylated fatty alcohols as emulsifiers, it is generally desirable to conduct the process with a polymerization initiator content in the range of from about 0.06 to about 0.75 percent by weight of the aqueous phase. Furthermore, the emulsifier should be present in an amount in the range of from about 0.9 to about 9 percent by weight of the aqueous phase and even more preferably, an amount in the range of from about 1.2 to about 3.0 percent by weight of the aqueous phase. Furthermore, the emulsion polymerization can be carried out at a temperature within the range of from about 70° to about 150° C and even more preferably at a temperature in the range of from about 85° to about 100° C. Furthermore, this process can be carried out at a pressure in the range of from about 2000 to about 5000 psi and preferably at a pressure in the range of from about 3000 psi to about 4000 psi.

When utilizing the above-described nonionic emulsifiers the reaction is preferably carried out in the presence of the free-radical initiator in an amount in the range of from about 0.08 to about 0.55 percent by weight of the aqueous medium. The emulsifier can be present in the range of from about 1.0 to about 5.0 percent by weight of the aqueous medium and more preferably in an amount in the range of from about 2.0 to about 4.0 percent by weight of the aqueous medium. The polymerization can be carried out at a temperature within the range of from about 60° to about 150° C and more preferably at a temperature in the range of from about 100° to about 110° C. Furthermore, the pressure can be in the range of from about 2000 psi to about 20,000 psi and is preferably within the range of from about 2500 to about 4500 psi.

When using a mixture of the anionic and nonionic emulsifiers, it is preferable that the mixture comprise from about 5 to about 75% by weight of nonionic emulsifier. In such instance, the emulsifier mixture can be present in the range of from about 1 to about 9 percent by weight of the aqueous medium. Furthermore, the initiator can be present in an amount in the range from about 0.06 to about 0.75 weight percent of the aqueous emulsion and the reaction can be carried out at a temperature within the range of from about 80° to about 100° C and a pressure in the range of about 2000 to about 3000 psi.

Although the polymerization can be readily effected in the presence of water as the sole liquid medium, an alcohol such as t-butanol can be included within the aqueous medium. The presence of such an alcohol is especially preferred when the sole emulsifier is a nonionic emulsifier. Such aqueous alcoholic medium can contain any amount of alcohol of the type that favorably influences the polymerization and the resultant emulsion. Generally up to about 35 percent by weight based on the combined weight of alcohol and water of an alcohol such as t-butanol can be acceptably included in the polymerization medium.

The reaction can be carried out in either a batch or continuous operation. In carrying out the polymerization process in accordance with the present invention, water, the emulsifier, the initiator, the pH adjuster (if necessary), and nonvaporous monomer(s) (alkyl vinyl monomer and/or vinyl ester monomer) are combined in any order in the amounts or proportions which are recited above. The components are mixed in a suitable pressure reactor, or a premixed aqueous phase is introduced into the suitable aqueous reactor. The reactor is equipped with a stirring mechanism in which fairly vigorous agitation of the contents is possible either by motion of the reactor or by agitating means of the reactor. The reactor is suitably made of a corrosion resistant material such as stainless steel or is equipped with a corrosion resistant lining such as glass or stainless steel. The reactor is then flushed with polymerization grade (99.8+% pure) ethylene to remove gaseous oxygen from the system. Preferably the polymerization grade ethylene contains less than 10–25 ppm of oxygen.

In some instances, it is desirable to initially add all ingredients but the initiator to the reactor and then heat the reactor to the operating temperature as set forth above, and then the initiator is introduced into the reactor, conveniently dissolved in a portion of the water component of the aqueous medium. In this instance, the initiator is conveniently added to the reaction zone in a sufficient quantity to produce a polymerization rate of about 5% per hour.

High pressure polymerization grade ethylene (and, if desired, a vaporous alkyl vinyl monomer) is introduced into the reactor. The pressure of the ethylene can be dependent upon the emulsifier as stated above. The reaction proceeds at the temperatures and pressures set forth above with constant vigorous agitation of the liquid contents of the reactor. As the polymerization proceeds, additional ethylene is continuously fed into the reactor to maintain the pressure. The polymerization is permitted until the emulsion reaches the desired solids content. This can be done by periodically withdrawing samples from the reactor and plotting the solids content as a function of time. A leveling off of the plotted solids content indicates that the reaction is slowing down and that the initiator is becoming depleted by thermal decomposition. When this happens, additional initiator can be added in small increments to maintain the polymerization rate of about 5% per hour. The emulsion produced will generally have a solids content of between about 15 and 25 weight percent.

Following the polymerization any solvent present such as t-butanol can be stripped from the latex and the latex concentrated by distillation under reduced pressure until the solids content is up to about 45 weight percent without adverse effect on the stability of the emulsion.

The resulting stable emulsions produced by the subject invention are very compatible with conventional polish and paint formulations and contribute to improved properties of these compositions as compared to such compositions containing stable polyethylene emulsions.

More specifically, the novel terpolymer emulsions produced in accordance with the subject invention can be incorporated into conventional latex paint formulations. Typical such latex paint formulations include both the gloss and semi-gloss latexes and acrylic polymers, copolymers, esters and polyvinylacetate and styrene-butadiene copolymers, for example. The typical latex paint formulations will contain a dispersing agent for pigments such as tetrasodium pyrophosphate, soya lecithin and the like; protective colloids and thickeners such as sodium polyacrylates, carboxymethylcellulose, colloidal clays, gum arabic, and the like; defoamers such as tri-n-butylphosphate, n-alkylalcohol, and other higher alcohols and the like; coalescing agents which include hexylene glycol and ethylene glycol, monobutyl ether acetate and the like; freeze-thaw additives such as, e.g., ethylene glycol; mildewcides and preservatives such as mercurial copper and phenolic compounds; and pH controllers such as ammonium hydroxide. The terpolymer emulsions produced in accordance with the subject invention can be incorporated into typical conventional formulas in amounts equaling from about 1 to about 20 weight percent thereof.

The novel terpolymer emulsions of the subject invention can also be incorporated into conventional polishes such as floor polishes which basically comprise aqueous emulsions. Liquid aqueous emulsion polishes generally comprise a waxy component and a resin component, including alkali soluble and alkali insoluble components, and leveling and plasticizing agents and fluxes. Depending on the characteristics desired in the final polish, the dispersed waxy and resinous component can be employed in proportions that constitute between about 5 and about 95% by weight of the total solids dispersed. Polyethylene emulsions have been utilized as the total or a part of the total of the waxy component. The conventional waxy components include natural and synthetic waxes.

A wide variety of alkali soluble and alkali insoluble natural and synthetic resins are known in the polish formulating art, including rosin, shellac, manilla, loba, terpene resins, terpene phenolic resins, polyvinylacetate, polyvinylchloride, polystyrene, polyvinylidene chloride, copolymers of vinyl chloride and vinyl acetate, copolymers of vinylidene chloride and acrylonitrile, vinyl acetate and crotonic acid copolymers, butadiene-styrene copolymers, condensation products of maleic anhydride or fumaric acid with rosin and mixed polyhydroxy alcohols, condensation products of maleic anhydride and pentaerythritol, condensation products of maleic anhydride and high molecular weight glycols, and polymers and copolymers of alkyl acrylates and methacrylates. These resins can also be polymers of allyl acrylate, methallylacrylate, allyl methacrylate, crothyl acrylate, crothylmethacrylate, allyl methacrylate, allyl cinnamate, methallylmethacrylate, methallylacrylate, diallyl phthalate, dimethallyl phthalate, diallylmaleate, divinylbenzene, and the like.

Suitable leveling agents, plasticizers or fluxers known to the art for use in wax polish formulations include phthalate plasticizers such as dibutylphthalate, alkylphosphate plasticizers such as tributylphosphate or tributyloxyethylphosphate, n-octanol and fluoroalkyl leveling agents taught in U.S. Pat. No. 2,937,098. The ethylene polymer emulsions of the subject invention are more compatible than conventional polyethylene emulsions with the above described polish formulations and also exhibit increased scuff and scratch resistance, slip resistance, gloss, black heel mark resistance, durability and stability without effecting detergent resistance and removability.

The following examples are set forth to better facilitate the understanding of this invention and are not intended to limit the scope thereof:

EXAMPLE I

An aqueous feed solution containing 93.5% by weight deionized water, 3.2% by weight dodecyl benzene sulfonic acid, 2.0% by weight vinyl acetate, 0.3% by weight potassium persulfate, 0.5% by weight octadecene-1, and 0.5% by weight sodium hydroxide was continuously fed to a 2000 gallon stainless steel reactor which was maintained at 90° C and at a pressure of 1700 psi by ethylene which was continuously supplied thereto. The reaction product from the continuous reactor was constantly withdrawn at a rate to maintain the residence time of 2.5 hours and a solids level in the product of 17.5 weight percent. The product was a fluid slightly translucent latex with no sediment or visible solid particles.

EXAMPLE II

An aqueous feed solution containing 91.4% by weight distilled water, 3.2% by weight of nonyl phenol polyethylene oxide having from 9 to 40 ethylene oxide groups, 2.5% by weight tertiary butyl alcohol, 0.3% by weight potassium persulfate, 0.1% by weight potassium hydroxide, 2.0% by weight vinyl acetate, and 0.5% by weight of octadecene-1 was fed to the continuous reactor as described in Example I which was operated at a temperature of 95° C and a pressure of 2500 psi to produce a product having a solids level of 17.5 weight percent. The product was a fluid, slightly translucent latex with no sediment or visible solid particles.

The emulsions produced by the processes as set forth in Example I and Example II were blended with conventional polish formulations. The emulsions imparted improved flexibility and toughness over that of polyethylene emulsions alone and displayed improved compatibility with the polish formulations as compared with the polyethylene emulsions alone.

While this invention has been described in relation to its preferred embodiment, it is to be understood that various modifications thereof will now be apparent to one skilled in the art upon reading the specification and it is intended to cover such modifications as fall within the scope of the appended claims.

We claim:

1. A process for producing stable polymer emulsions of polymer particles comprising mixtures of polyethylene and terpolymers of ethylene, a vinyl monomer, selected from the group consisting of vinyl ester monomers of straight and branched chain carboxylic acids and straight and branched chain vinyl alkyl ether monomers, and an alkyl vinyl monomer having molecular weights in the range of from about 7,000 to 40,000 and particle sizes in the range of from about 200 to 1,000 angstroms which includes contacting ethylene, a vinyl monomer, and an alkyl vinyl monomer having from about 3 to about 24 carbon atoms, in an aqueous reaction medium having a pH of about 8.5 to 14.0 at a temperature in the range of from about 60° to 150° C and a pressure in the range of from about 1,400 to 20,000 psi in the presence of a water soluble persulfate initiator and an effective amount of an emulsifier selected from nonionic and anionic emulsifiers and mixtures thereof, wherein said vinyl monomer is present in an amount equal to about 0.5 to 20% by weight based on said aqueous reaction medium and wherein said alkyl vinyl monomer is present in an amount equal to about 0.1 to 10% by weight based on said aqueous reaction medium, to form said emulsion.

2. The product produced by the process of claim 1.

3. The process of claim 1 wherein said vinyl monomer has the structural formula of:

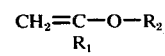

$$CH_2=C-O-R_2$$
$$\quad\; R_1$$

wherein $R_1$ is selected from hydrogen and a methyl group and $R_2$ is selected from straight and branched chain alkyl and acyl groups having from 1 to about 10 carbon atoms, and straight and branched chain alkoxy groups having from 1 to about 10 carbon atoms.

4. The process of claim 3 wherein said vinyl monomer is vinyl acetate.

5. The process of claim 3 wherein said vinyl monomer is ethyl vinyl ether.

6. The process of claim 1 wherein said anionic emulsifiers are selected from alkali metal salts of alkyl aryl sulfonates, salts of saturated fatty acids having from about 12 to about 18 carbon atoms, salts of sulfates of saturated fatty acids having from about 5 to about 18 carbon atoms, and salts of sulfates of ethoxylated saturated fatty alcohols having from about 12 to about 18 carbon atoms and an average number of ethoxy groups between 1 and 5.

7. The process of claim 6 wherein said nonionic emulsifiers are selected from alkyl phenoxy polyoxyethylene ethanols.

8. The process of claim 7 wherein said initiator is present in an amount in the range of from about 0.08 to about 0.55% by weight of said aqueous medium and said emulsifier is present in an amount in the range of from about 1 to about 5% by weight of said aqueous medium.

9. The process of claim 8 wherein said vinyl monomer is vinyl acetate and said alkyl vinyl monomer is octadecene-1.

10. The process of claim 6 wherein said emulsifier is an alkali metal salt of an alkyl benzene sulfonic acid wherein the alkyl group has from about 6 to about 18 carbon atoms.

11. The process of claim 10 wherein said initiator is present in an amount ranging from about 0.1 to about 0.75 percent by weight of said aqueous medium and said emulsifier is present in an amount ranging from about 1 to about 7% by weight of said aqueous medium.

12. The process of claim 11 wherein said vinyl monomer is vinyl acetate and said alkyl vinyl monomer is octadecene-1.

13. The process of claim 1 wherein said emulsifier is a member selected from a group consisting of (1) a salt of a saturated fatty acid having from about 12 to about 18 carbon atoms, (2) a salt of a sulfate of a saturated fatty alcohol having about 12 to 18 carbon atoms, and (3) a salt of a sulfate of an ethoxylated saturated fatty alcohol having about 12 to about 18 carbon atoms and an average number of ethoxy groups between 1 and 5.

14. The process of claim 13 wherein said initiator is present in an amount in the range of from about 0.06 to about 0.75% by weight of said medium and said emulsifier is present in an amount in the range of from about 0.9 to about 9% by weight of said aqueous medium.

15. The process of claim 14 wherein said vinyl monomer is vinyl acetate and said alkyl vinyl monomer is octadecene-1.

16. A stable polymeric emulsion comprising a plurality of emulsified solid particles having molecular weights in the range of from about 7,000 to 40,000, and particle sizes in the range of from about 200 to 1,000 angstroms, emulsion polymerized in the presence of a water soluble persulfate catalyst, said particles comprising polyethylene and a terpolymer of ethylene, a vinyl monomer selected from the group consisting of vinyl ester monomers of straight and branched chain alkyl carboxylic acids and straight and branched chain vinyl alkyl ether monomers, and an alkyl vinyl monomer having from about 3 to about 24 carbon atoms, being suspended in an aqueous medium comprising water and a minor effective amount of an emulsifier selected from anionic emulsifiers, nonionic emulsifiers and mixtures thereof.

17. The emulsions of claim 16 wherein said anionic emulsifiers are selected from alkali metal salts of alkyl aryl sulfonates, salts of saturated fatty acids having from about 12 to about 18 carbon atoms, salts of sulfates of saturated fatty alcohols having from about 12 to about 18 carbon atoms, and salts of sulfates of ethoxylated saturated fatty alcohols having from about 12 to 18 carbon atoms and an average number of ethoxy groups between 1 and 5.

18. The polymeric emulsion of claim 17 wherein said nonionic emulsifiers are selected from alkyl phenoxy polyoxyethylene ethanols.

19. The process of claim 18 wherein said vinyl monomer is vinyl acetate and said alkyl vinyl monomer is octadecene-1.

20. The emulsion of claim 18 wherein said vinyl monomer is ethyl vinyl ether.

* * * * *